US010845200B2

(12) United States Patent
Ondruska et al.

(10) Patent No.: US 10,845,200 B2
(45) Date of Patent: Nov. 24, 2020

(54) DISTRIBUTED DEVICE MAPPING

(71) Applicant: BLUE VISION LABS UK LIMITED, London (GB)

(72) Inventors: Peter Ondruska, London (GB); Lukas Platinsky, London (GB)

(73) Assignee: BLUE VISION LABS UK LIMITED, London (GB)

(*) Notice: Subject to any disclaimer, the term of this patent is extended or adjusted under 35 U.S.C. 154(b) by 0 days.

(21) Appl. No.: 16/653,708

(22) Filed: Oct. 15, 2019

(65) Prior Publication Data
US 2020/0080849 A1 Mar. 12, 2020

Related U.S. Application Data

(63) Continuation of application No. PCT/GB2018/051023, filed on Apr. 18, 2018.
(Continued)

(30) Foreign Application Priority Data

Apr. 18, 2017 (GB) .................................. 1706129.2
Mar. 15, 2018 (GB) .................................. 1804193.9

(51) Int. Cl.
G01C 21/32 (2006.01)
G01C 21/12 (2006.01)
(Continued)

(52) U.S. Cl.
CPC ............. G01C 21/32 (2013.01); G01C 11/06 (2013.01); G01C 21/12 (2013.01); G01S 17/89 (2013.01);
(Continued)

(58) Field of Classification Search
CPC ...... G01C 11/06; G01C 11/30; G01C 21/005; G01C 21/30; G01C 21/32;
(Continued)

(56) References Cited

U.S. PATENT DOCUMENTS 8,798,840 B2 * 8/2014 Fong .................... G05D 1/0274
701/23
10,242,453 B2 * 3/2019 Cameron ................ G06T 7/579
(Continued)

FOREIGN PATENT DOCUMENTS

CA 2787856 11/2013
EP 2246763 11/2010
(Continued)

OTHER PUBLICATIONS

Forster, Christian, et al., "Collaborative Monocular SLAM with Multiple Micro Aerial Vehicles", 2013 IEEE/RSJ International Conference on Intelligent Robots and Systems (IROS), IEEE, Nov. 3, 2013, pp. 3963-3970.
(Continued)

Primary Examiner — Peter D Nolan
Assistant Examiner — Ce Li Li
(74) Attorney, Agent, or Firm — Sheppard Mullin Richter & Hampton LLP

(57) ABSTRACT

The present invention relates to the efficient use of both local and remote computational resources and communication bandwidth to provide distributed environment mapping using a plurality of mobile sensor-equipped devices.

According to a first aspect, there is provided a method of determining a global position of one or more landmarks on a global map, the method comprising the steps of determining one or more differences between sequential sensor data captured by one or more moving devices; determining one or more relative localisation landmark positions with respect
(Continued)

to the one or more moving devices; determining relative device poses based one or more differences between sequential sensor data relative to the one or more relative localisation landmark positions; and determining a correlation between each device pose and the one or more relative localisation landmarks positions.

23 Claims, 7 Drawing Sheets

Related U.S. Application Data

(60) Provisional application No. 62/486,761, filed on Apr. 18, 2017.

(51) Int. Cl.
| | |
|---|---|
| G01C 11/06 | (2006.01) |
| G01S 17/89 | (2020.01) |
| G01S 19/47 | (2010.01) |
| G06T 7/73 | (2017.01) |

(52) U.S. Cl.
CPC ............... *G01S 19/47* (2013.01); *G06T 7/74* (2017.01); *G06T 2207/10012* (2013.01); *G06T 2207/10016* (2013.01); *G06T 2207/10028* (2013.01)

(58) Field of Classification Search
CPC . G06T 2207/10012; G06T 2207/10016; G06T 2207/10021; G06T 2207/10028; G01S 17/89; G01S 19/47
See application file for complete search history.

(56) References Cited

U.S. PATENT DOCUMENTS

| 10,371,529 | B2* | 8/2019 | Roumeliotis | G05D 1/027 |
|---|---|---|---|---|
| 10,474,162 | B2* | 11/2019 | Browning | G06T 7/33 |
| 2012/0121161 | A1* | 5/2012 | Eade | G09B 29/007 |
| | | | | 382/153 |
| 2012/0162376 | A1 | 6/2012 | Ohtomo et al. | |
| 2014/0005933 | A1* | 1/2014 | Fong | G05D 1/0274 |
| | | | | 701/447 |
| 2014/0249752 | A1 | 9/2014 | Napier et al. | |
| 2014/0333741 | A1* | 11/2014 | Roumeliotis | G01S 5/16 |
| | | | | 348/61 |
| 2015/0172626 | A1* | 6/2015 | Martini | G06T 7/0008 |
| | | | | 348/50 |
| 2015/0228077 | A1 | 8/2015 | Measche et al. | |
| 2016/0147230 | A1* | 5/2016 | Munich | G05D 1/0246 |
| | | | | 701/28 |
| 2017/0008521 | A1* | 1/2017 | Braunstein | G01C 21/165 |
| 2017/0017839 | A1* | 1/2017 | Hiramatsu | G06K 9/00664 |
| 2017/0343356 | A1* | 11/2017 | Roumeliotis | G01C 21/32 |
| 2018/0045519 | A1* | 2/2018 | Ghadiok | G05D 1/0246 |
| 2018/0189971 | A1* | 7/2018 | Hildreth | H04N 5/232 |
| 2019/0137280 | A1* | 5/2019 | Ghadiok | G06T 7/73 |

FOREIGN PATENT DOCUMENTS

| EP | 2662664 | 11/2013 | | |
|---|---|---|---|---|
| WO | WO-2017172778 A1 * | 10/2017 | | G05D 1/027 |

OTHER PUBLICATIONS

Haines, Osian, "An Introduction to Simultaneous Localisation and Mapping", published May 13, 2016 at http://www.kudan.eu/kudan-news/an-introduction-to-slam/ on Mar. 15, 2017, 5 pages.

Kummerle, Rainer, et al., "G2o: A General Framework for Graph Optimization", 2011 IEEE International Conference on Robotics and Automation (ICRA), May 9, 2011, pp. 3607-3613.

Riisgaard, Soren, et al., "SLAM for Dummies: A Tutorial Approach to Simultaneous Localization and Mapping", 2005, 127 pages.

Saeedi, Sajad, et al., "Multiple-Robot Simultaneous Localization and Mapping: A Review", Journal of Filed Robotics, vol. 33, No. 1, Jan. 2016, pp. 3-46.

Salakhutdinov, Ruslan, et al., "Semantic Hashing", International Journal of Approximate Reasoning, vol. 50, 2009, pp. 969-978.

Teller, "Simultaneous Localization and Mapping (SLAM)", RSS Lecture 16 dated Apr. 8, 2013, 20 pages.

Vidal-Calleja, Teresa, et al., "Large Scale Multiple Robot Visual Mapping with Heterogeneous Landmarks in Semi-Structured Terrain", Robotics and Autonomous Systems, vol. 59, No. 9, Elsevier Science Publishers, Amsterdam, NL, May 24, 2011, pp. 654-674.

* cited by examiner

DISTRIBUTED DEVICE MAPPING

CROSS-REFERENCE TO RELATED APPLICATIONS

The present application is a continuation of International Application No. PCT/GB2018/051023 filed Apr. 18, 2018 which claims benefit of U.S. Provisional Application No. 62/486,761 filed Apr. 18, 2017 and Great Britain Application No. 1706129.2 filed Apr. 18, 2017 and Great Britain Application No. 1804193.9 filed Mar. 15, 2019 which are hereby incorporated by reference herein.

FIELD

The present invention relates to a hardware and software method for environment mapping. More particularly, the present invention relates to the efficient use of both local and remote computational resources and communication bandwidth to provide distributed environment mapping using a plurality of mobile sensor-equipped devices to build a globally consistent and accurate map of large-scale environments and to determine accurate positions of localisation landmarks and enable the recovery of the trajectory of poses (three dimensions of position and three-dimensions of rotation) of individual sensors.

BACKGROUND

The capability to construct, with a high degree of precision, a globally-consistent and accurate map of a large-scale environment such as a city, for example having precision to within a centimetre, is likely to be pivotal for many robotics, augmented- and virtual-reality applications.

An example of a particularly useful form of map is map data relating to three-dimensional positions for localisation landmarks or points-of-interest. This localisation landmark data allows for localisation functionality, based on this localisation landmark data within a map of a large-scale environment, as each of the landmarks in the localisation landmark data can be observed and detected by sensors on devices operating using the map of the large-scale environment and the localisation landmark data (where the map and data may optionally be combined), and the device can then associate the observed landmarks and their positions in the map with the device position as the landmark(s) is/are observed by the device sensor(s). This, in turn, allows computation of an accurate estimate of sensor position and rotation with respect to the mapped environment.

For example, the aforementioned centimetre-level precision is likely to be critical to aforementioned example applications. This level of accuracy is typically not achievable in urban environments using the global navigation satellite system (GNSS) owing to various atmospheric effects, strong reflection, or limited satellite visibility due to occlusion of the sky by tall buildings.

The exact form of the individual localisation landmarks, their detection and association depends on the employed sensor and localisation technology.

As an example, for camera-based sensors, a known method that can be used is to detect image features (for example by using approaches such as detecting image corners, Scale-invariant Feature Transform ('SIFT'), or Speeded Up Robust Features ('SURF')). Detected image features can then be associated with localisation landmarks in a map, thereby allowing the triangulation of the position of the camera on each device.

As an alternative example, a similar functionality can be achieved by using so called direct methods of optimising the image reprojection error of the localisation landmarks. In this case localisation landmarks take the form of a three-dimensional point cloud or surface structure of the environment. For laser, Light Detection and Ranging ('LIDAIR'), or depth-camera sensors a similar method of determining the iterative closest point can be used to align sensor measurements against the three-dimensional model of the environment to achieve similar effect.

Different methods can be used interchangeably or in conjunction for existing or future sensors.

Methods for constructing such localisation landmark data have been studied in various disciplines and known methods exist for their construction at a small scale. For example, considering camera sensor data, such a map can be constructed from a collection of two-dimensional images of the environment using so called structure from motion methods. An example of such a method is a computation known as a "Bundle Adjustment". These methods involve jointly solving the problem of estimating all image poses in the three-dimensional space and the corresponding locations of observed landmarks. The disadvantage of this solution is that it is very computationally and memory intensive. Existing available state-of-the-art methods and packages, such as OpenMVG or OpenSfM, scale poorly with the amount of data being processed thus limiting their applicability to only few thousands of pictures at once. This is not sufficient for mapping a large-scale environment, using the millions or billions of pictures that are likely to be necessary for the aforementioned applications. Using distributed computation to implement these methods is difficult due to the large number of potential data constraints necessary to ensure global consistency.

A separate problem involves the difficulties involved with obtaining sensor data. Given the size of the mapped environment the effort of obtaining sensor data can be distributed, but distributing the data collection across multiple devices can result in multiple sensors mapping the environment simultaneously and the resultant data typically being transferred to a single localised storage for computation. It is also likely that data transfer is required to occur as the data is being collected, for example through a cellular network or other bandwidth-restricted channel, to minimise any or all of downtime, requirements for local storage and/or to avoid additional complexity associated with docking the device to the storage. Substantially simultaneous data transfer is likely to be needed for a lifelong continuous mapping system of the environment. Restricted bandwidth situations combined with a requirement for near simultaneous data transfer over a bandwidth-limited channel puts additional restrictions on the structure of the data collected.

Real-time simultaneous localisation and mapping (SLAM) systems such as ORB SLAM or LSD SLAM are used as alternates to state-of-the-art methods by producing faster results at the expense of solution quality. These systems avoid a full-map bundle adjustment to achieve a real-time map building performance. However, although such systems perform relatively well with single-device settings, they are not designed for multi-device mapping which is necessary to construct maps of large environments.

It is therefore desired that utilisation of sensors, available bandwidth, local and remote storage and computational resources is as efficient as possible.

SUMMARY OF INVENTION

Aspects and/or embodiments seek to provide a distributed localisation and/or mapping system capable of delivering substantially high-accuracy real-time localisation at a device. Aspects and/or embodiments also seek to address the problem relating to structure from motion methods where a three-dimensional reconstruction of an environment is difficult to obtain in dependence upon two-dimensional sensor images.

According to a first aspect, there is provided a method of determining a global position of one or more landmarks on a global map, the method comprising the steps of determining one or more differences between sequential sensor data poses captured by one or more moving devices; estimating one or more relative localisation landmark positions with respect to the one or more moving devices; estimating relative device poses for the one or more moving devices in dependence upon the one or more relative localisation landmark positions; determining absolute device positions by optimising the estimated relative device poses; and determining an absolute global position for the one or more localisation landmarks based on a correlation between each absolute device pose or position and the one or more relative localisation landmark positions.

The locations of any number of objects or features of an environment that is easily recognisable at a distance can be identified and located by a plurality of mobile devices equipped with sensors for capturing data at regular intervals along a movement path.

The term global map throughout the specification can respectively be replaced with base map, map or a map stored at a sever. A portion of a map stored at a server can also be used in some aspects and/or embodiments. In some instances, the term pose graph can be used to describe an environment without landmarks being located.

Having located the positions of a landmark, the location and/or pose of a plurality of mobile devices can be identified with respect to the landmark. More than one landmark can be used to identify where a mobile device is, and even in which direction a mobile device is facing. The estimated landmark positions are therefore used to generate constraint values to further optimise the relative poses and/or positions.

Optionally, optimising the device poses comprises satisfying or minimising a constraint based on the estimated relative poses between sensor data. The sensor can be sequential data for the same device or data from other devices.

Optionally the step of determining one or more differences comprises a time stamp for each sequential sensor data.

The sensor of the device can capture consecutive measurements which advantageously requires less computational power and memory intensive systems.

Optionally, the one or more devices comprise as a sensor any or a combination of: an image camera; a video camera; a laser based sensor; a depth camera; a stereo camera; a high dynamic range camera; a light detection and ranging sensor; a radio detection and ranging sensor.

Optionally, the step of determining one or more differences is performed in real-time on each of the one or more devices.

Since the method does not require a large amount of computational power or memory, the calculations of differences between the consecutive data measurements captured by the sensors can be performed on each device to lessen the bandwidth requirements of the overall system.

Optionally, the sensor data comprises pose data.

Pose data can relate to position and orientation of the device. More particularly, pose data of a sensor can relate to the pose of a sensor at the time the sensor data is captured.

Optionally, the step of determining one or more differences comprises relative pose between sequential sensor data.

The differences between poses, or sensor data, can relate to the amount a device has rotated and/or traversed.

Optionally, the step of estimating one or more relative localisation landmark positions comprises obtaining landmark data substantially directly from the one or more device sensors.

Optionally, the step of estimating one or more relative localisation landmark positions is based upon triangulation of the sequential sensor data.

As sequential data can enable easier computation, a localisation landmark can be captured by a sensor several times as the device traverses an environment. Simple triangulation techniques can be implemented to locate the landmark on a base map using a sequence of sensor data alone.

Optionally, the step of estimating one or more relative localisation landmark positions is performed in substantially real-time on each of the one or more devices.

The relative positions of the localisation landmarks can be determined almost instantaneously by the device or within the system.

Optionally, the step of determining one or more differences and the step of estimating one or more relative localisation landmark positions is performed independently.

These steps can also be performed at the same time to determine the relative movement of the sensor(s) and the relative position of the landmarks.

Optionally, determining relative device poses based on one or more differences between sequential sensor data comprises determining a relative pose between one or more sensors.

The position of the one or more device can be more accurately identified based on the orientation or movement difference between the same device in the same area as it was previously, or by another device in the same area.

Optionally, the step of estimating relative device poses is performed on a centralised server or distributed across a cluster of computers within the network.

Optionally, the step of determining correlation, in the method of the first aspect, each landmark position is computed independently.

The efficient distribution of the computational power can enable the position of each localisation landmark to be determined independently from all others.

Optionally, the step of determining correlation, in the method of the second aspect further comprises any combination of Global Navigation Satellite System, GNSS, and Inertial Measurement Unit, IMU, data.

Optionally, the data captured by the sensors is distributed across a plurality of devices.

The efficiency of the data collected by the devices can be significantly improved by splitting the data among multiple devices.

Optionally, the data captured by the sensors is transmitted through a wireless network.

The efficiency of the data collected by the devices can be improved by communicating the data using a wireless network.

Optionally, the determinations and/or computations are performed on a combination of devices and a centralised server.

Optionally, the step of determining absolute device positions comprises minimising the difference between the estimated relative device poses and their determined pose after optimisation.

Efficiency of computation can be achieved by splitting the computation between the cloud and sensors/devices.

Optionally, the determinations and/or computations are performed on a device within a geographical area.

Efficiency of computation can be achieved through computing loop closures, is performed only in geographically close sensor locations.

Optionally, the method of re-computing poses of devices from known landmarks and re-computing positions of localisation landmarks. Re-computation can further enhance the accuracy of location and/or pose information for the devices and the localisation landmarks. Optionally, this can have a form of simultaneous optimisation of landmark positions and sensor poses known as "bundle adjustments".

The re-computing step can be performed a number of times.

Optionally, sensor data is used to create or update the global map. Optionally, creating or updating the global map comprises any of: creating a new constraint or variable, such as pose data, in the global map; updating or amending an existing node in the global map; deleting a node in the global map; optimising the global map; or performing global loop-closures to link positions of different localisation nodes.

Updating the global map or global master map using sensor data allows the global map to adapt over time and continuously improve through AR uses. This includes the global map growing larger in size and richer in data for, for example, different environmental conditions.

Optionally, the global map comprises digital content associated with the one or more landmarks. Optionally, the digital content comprises any of: a picture, textual description or a video. In this way, landmarks can be annotated to enable a more personalised or descriptive tag of the landmark.

According to another aspect, there is provided an apparatus comprising a plurality of sensors operable to traverse an environment and collate pose data in sequence and communication means operable to send the pose data to a server system, wherein the server system is operable to perform the method of any preceding claim.

The server system can be a centralised sever or a collation of cloud and mobile devices.

According to another aspect, there is provided a computer program product for providing the method or system of any preceding claim.

According to another aspect, there is provided a method of determining a pose of one or more devices on a global map, the method comprising the steps of determining one or more differences between sequential sensor data captured by one or more moving devices; determining one or more relative localisation landmark positions with respect to the one or more moving devices; determining relative device poses based one or more differences between sequential sensor data relative to the one or more relative localisation landmark positions; and determining a correlation between: the relative device poses and differences between sequential sensor data and the one or more relative localisation landmark positions.

BRIEF DESCRIPTION OF DRAWINGS

Embodiments will now be described, by way of example only and with reference to the accompanying drawings having like-reference numerals, in which.

SPECIFIC DESCRIPTION

An example embodiment will now be described with reference to FIGS. 1 to 7.

Figure 1:
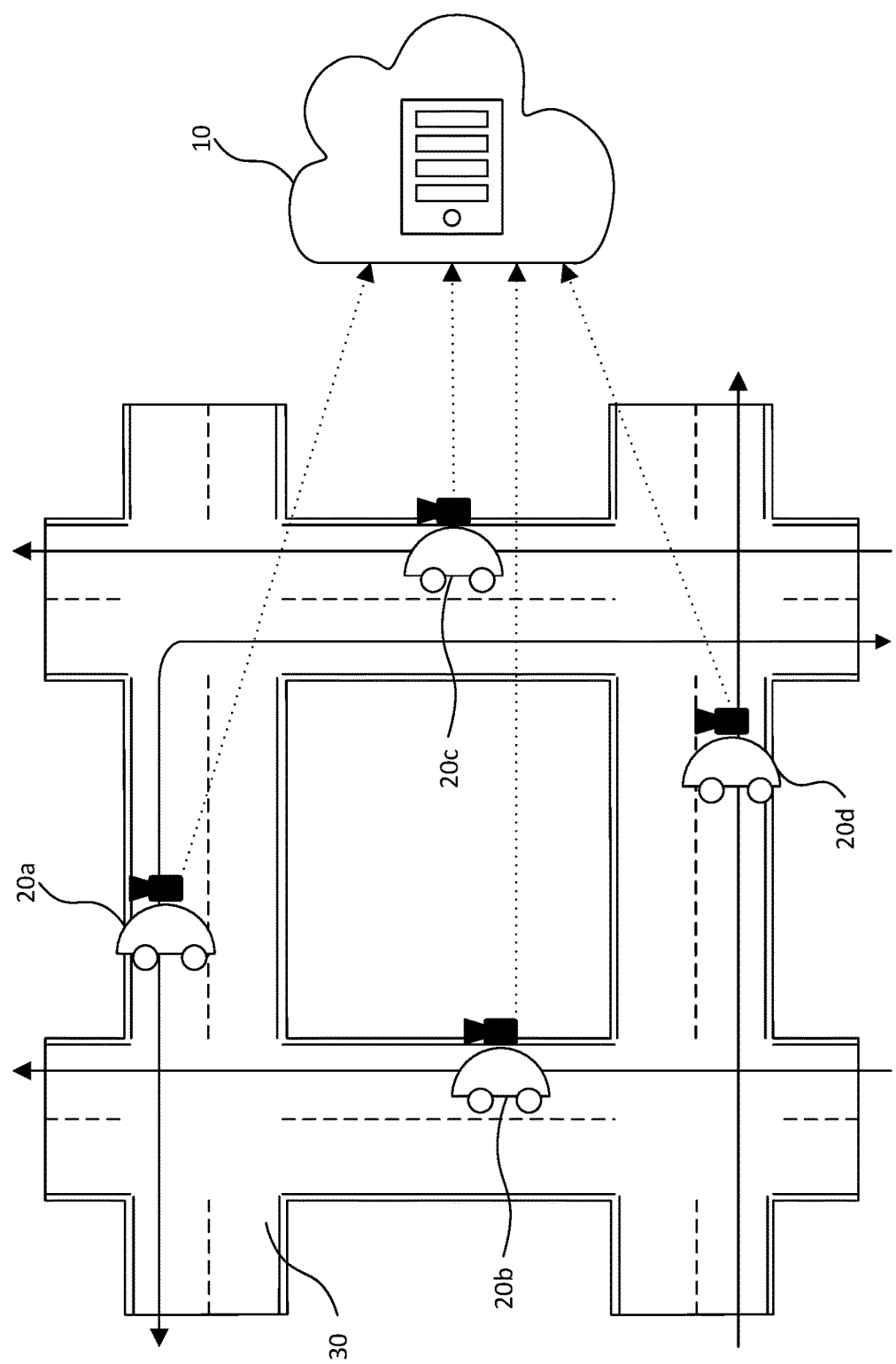
FIG. 1 illustrates an overview of the cloud server system in communication with a plurality of mobile platforms in transit on an example road layout according to an embodiment.

Referring now to FIG. 1, a typical implementation of the system according to at least one embodiment is shown. In the implementation shown in this diagram, there is provided a centralised server system or cloud-based server 10 communicating with a plurality of platforms 20*a*, 20*b*, 20*c*, 20*d* where the platforms in this example are automobiles. Each of the platforms 20*a*, 20*b*, 20*c*, 20*d* are equipped with one or more sensors, which in this example are image or video cameras.

The server system 10 of this embodiment will now be described in more detail below.

In this embodiment, the server system 10 is running on and implemented using cloud infrastructure, but in other embodiments the server system 10 may have a variety of physical and/or virtual configurations. In other embodiments, for example, there may be one or more servers and/or server systems and, where there are more than one servers and/or server systems, these may be configured to act as a single server or server system or as multiple independent servers or server systems and may or may not be in direct communication with each other.

Such a system is able to construct large maps of the environment by using a fleet of mobile sensors (on-board platforms 20*a*, 20*b*, 20*c*, 20*d*) to develop a special problem structure which can then be solved by distributed computation, effectively exploiting the computational power of both the platform (i.e. mobile) and cloud (i.e. cloud-based server) resources.

In use, the platforms 20*a*, 20*b*, 20*c*, 20*d* traverse the environment 30 (which in the example of FIG. 1 is a road system) and at the same time record sensor data. Depending on the embodiment, this sensor data can include any of camera data, laser data, GNSS or other satellite positioning data, and/or IMU data. This sensor data is in its raw form (that is to say 'unprocessed') and is then communicated to the server system 10 or to centralised data storage, such as a cloud storage implementation. The data communication, or transfer, can occur through, for example, a wireless data network such as a 'phone data network or Wireless LAN, or logs can be stored locally on each platform 20*a*, 20*b*, 20*c*, 20*d* and transferred later in order to reduce bandwidth requirements.

The platforms 20a, 20b, 20c, 20d in other embodiments can be a variety of other vehicles (manned or unmanned) or alternatively devices such as mobile phones or AR/VR headsets or similar devices having sensors and the ability to communicate data with the cloud-based server 10.

Figure 4:
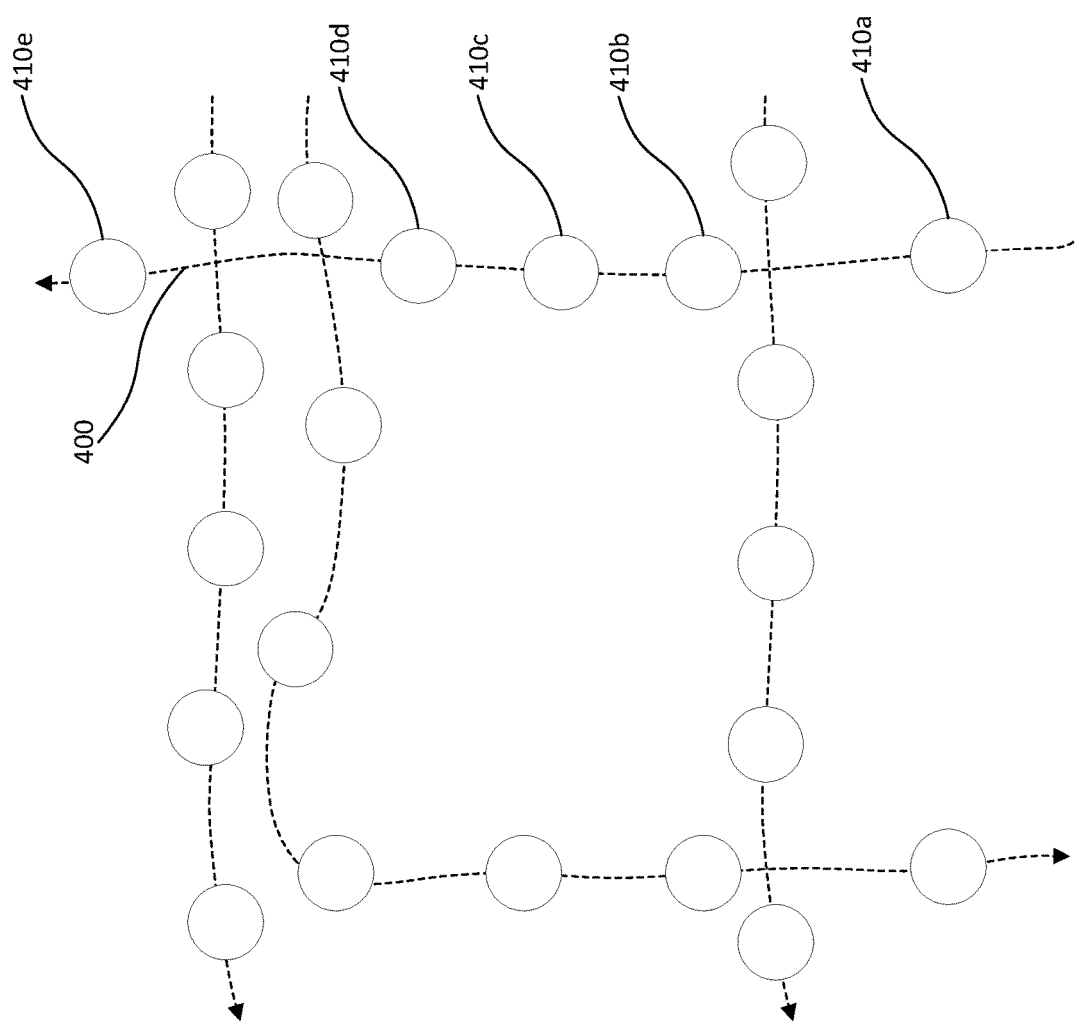
FIG. 4 illustrates sensor measurements for each platform in transit along the transit routes of FIG. 3.

Referring now to FIG. 4, the process outlined above in relation to FIG. 1 results in the creation of a dataset including a set of independent logs or datasets each containing a sequence of captured data 410a, 410b, 410c, 410d, 410e from a single device or platform as it progresses/progressed along a trajectory 400. Each entry in the log or dataset 410a, 410b, 410c, 410d, 410e captures sensor data, for example an image frame or laser scan, that was captured by the respective device or platform at a particular moment in time when the device or platform was at a particular pose in three-dimensional space.

For most entries, i.e. points for which sensor data has been captured for each platform 20a, 20b, 20c, 20d, the exact pose (i.e. position and orientation) of the sensor on each platform 20a, 20b, 20c, 20d is not usually known and it is also possible that only an approximate position for the platform 20a, 20b, 20c, 20d, for example available through GNSS, is directly known.

In some embodiments, for efficiency purposes and to reduce the amount of data that needs to be processed/handled/transmitted, sensor data can be sub-sampled at a selected frequency in time (for example, three frames per second) or space (for example, a new sensor reading every x metres) or, in other embodiments, using another method or a hybrid method with the aim that good coverage of the environment is substantially achieved (for example, through use of an uncertainty function based on the speed of movement through the environment and the constraint to keep the function below a certain threshold of uncertainty value).

The sensor data, or sub-sampled sensor data, is then sent to be processed on a centralised server system 10 where all data is stored and computation of the map is executed.

In some embodiments, if the platform 20a, 20b, 20c, 20d or sensor thereupon is equipped with a processor of sufficient computational power then it can perform locally at least a part of the computation on data captured (as described later) and uploads the computation result to the centralised server 10 together with or instead of the sensor data or sub-sampled sensor data. This can result in a solution having higher scalability, as a major portion of the computation can be offloaded from the centralised server 10 to a sufficiently computationally powerful local resource located on the platform 20a, 20b, 20c, 20d (for example the sensor device on the platform 20a, 20b, 20c, 20d). Additionally, it may also reduce the bandwidth required for uploading the data to the centralised server 10.

Figure 2:
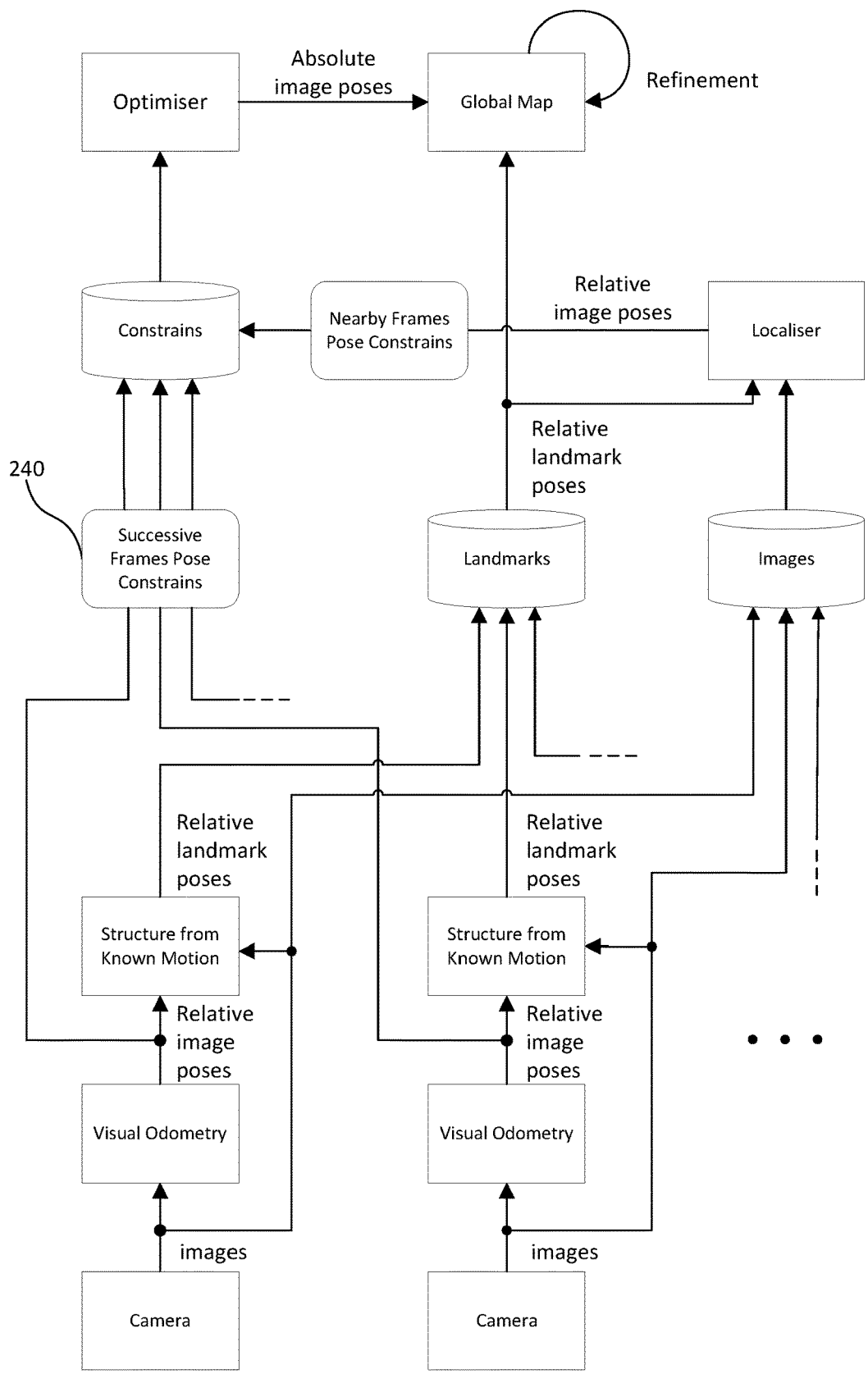
FIG. 2 illustrates a flowchart showing the system operation between platforms and server system according to an embodiment.

Referring now to FIG. 2, an illustration of the sensors used, data collected and processed and communications in an embodiment are shown. The computation performed in at least one embodiment will now be described in detail.

The function of the computation in the embodiments is to substantially accurately determine the global position of both individual sensor device/platform poses and any observed localisation landmarks, both of which comprise the base map. When the system is initialised, for example when it is first started or when a new platform is added or new location is being mapped, neither the global position of the individual sensor device/platform pose nor any observable localisation landmarks are known and so must be computed.

As shown in FIG. 2, a method according to an embodiment for computing the base map is illustrated. This method comprises several steps:

(1) The relative transform between successive sensor poses is computed;

The first step involves independently estimating the relative motion of the individual sensors as they are traversing the mapped environment based on the captured data.

In this embodiment, a specific structure is adopted for the data such that it is stored sequentially in the order in which sensor data is collected. The sensor data can be the pose of a camera when it captured image data. As consecutive sensor measurements can be assumed to differ only slightly in capture position, a time stamp for each sensor measurement allows the use of computationally-lightweight odometry methods (instead of more computationally and memory intensive full-SLAM implementations). For example, such a computationally-lightweight odometry method is the use of an effective visual odometry method used in conjunction with a camera sensor to estimate the relative motion between camera frames. Further, this process can be carried out in real-time on the sensor device (or platform) itself as the data is captured, rather than at a remote server or cloud, provided there is a dedicated chip or sufficient computational power available locally in the sensor device (or platform).

Figure 3:
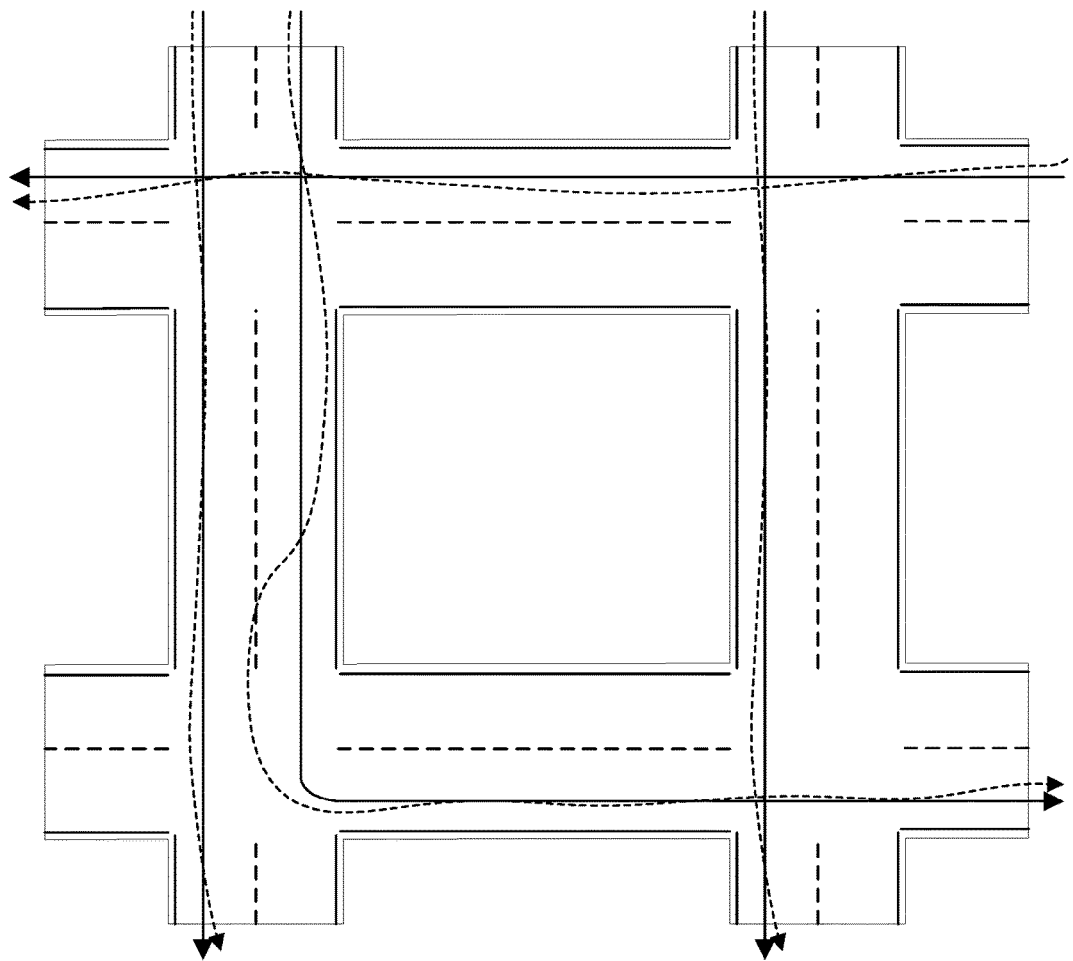
FIG. 3 illustrates trajectories for a plurality of platforms according to the embodiment of FIG. 1.

The output from the odometry applied to the sequential data are motion estimates that can be locally-smooth and locally-accurate between successive frames but which can, however, "drift" over time—i.e. become increasingly inaccurate when compared to the true motion or actual/global position—thus lack globally accurate position or scale in the three-dimensional space. Thus, these motion estimates might not accurately represent the true trajectory that the sensor device (or platform) has travelled in the three-dimensional space (for example as illustrated in FIG. 3) and thus cannot be relied upon.

Figure 5:
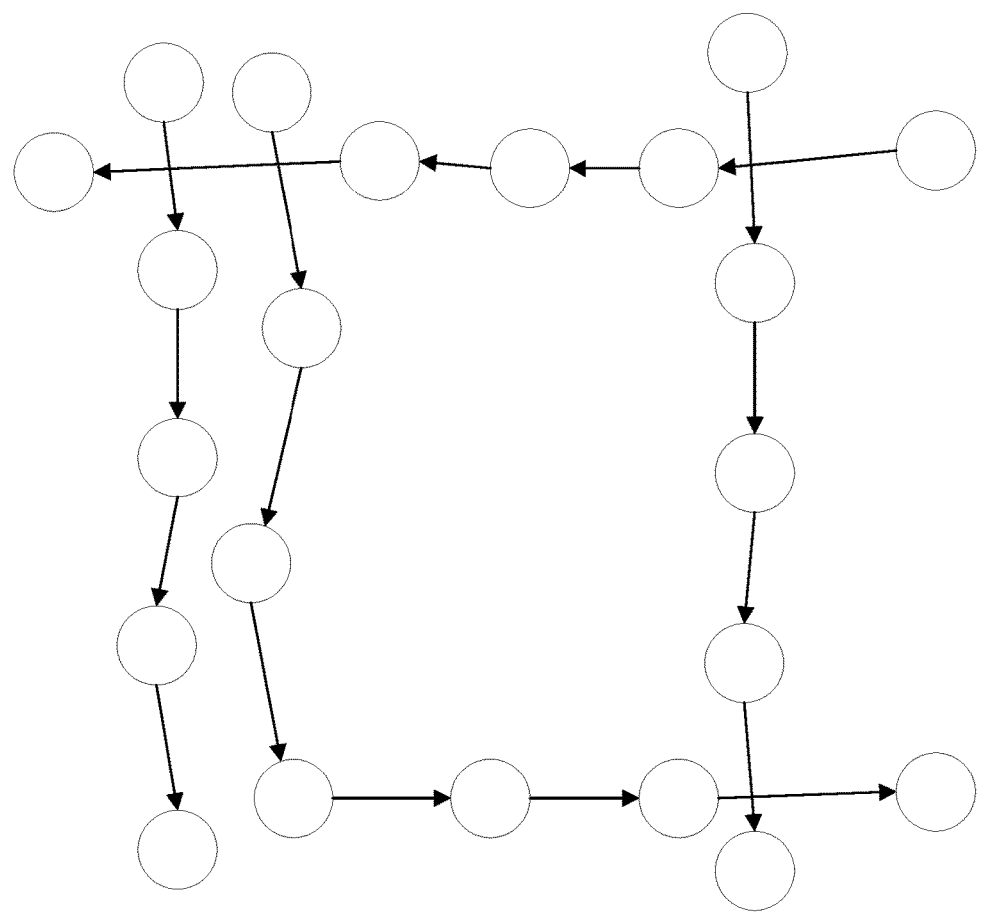
FIG. 5 illustrates the sequence of the sensor measurements of FIG. 4.

The result of the computation performed in this step is the output of a relative pose (i.e. rotation and translation) between successive camera positions in individual logs, as shown in FIG. 5.

(2) The relative positions of localisation landmarks are computed;

The second step is to perform the computation of the relative position of observable localisation landmarks along each of the trajectories of each platform. The landmark data can be obtained directly from a sensor (for example as a local point-cloud if the sensor is laser-based or a stereo- or depth-camera system) or the positions of the landmarks can be triangulated from successive sensor movements as the device moves (for example where the device or system is estimating image features with a camera).

As only the relative pose of the sensor positions is known at this stage from the first step, the absolute positions of the landmarks cannot be determined accurately. Only the relative positions of landmarks with respect to the sensor device or platform, based on captured sensor poses, can be computed and stored. This computation is carried independently for each log in this embodiment. Again, the sequential structure of the data makes this computation easier, as a single landmark is likely to be observed in a sequence of consecutive frames that are necessary for its triangulation relative to the estimated motion of the sensor device or platform, and thus data for each observed and triangulated landmark can also be stored on the captured device itself.

Optionally, in some embodiments the first step of computing visual odometry can be combined with the second step of estimating positions of landmarks to jointly produce relative motion estimates of the sensor and relative position data for landmarks.

(3) The relative pose between nearby sensor poses is computed;

The third step is to detect and estimate relative poses between different sensors or the same sensor when these visit the same place again (i.e. the same location in the master or base map) in the mapped environment, in order to perform a process called loop closing.

The process of loop closing can be achieved by means of a two-stage process:

First, it is determined whether or when a sensor visits somewhere in the mapped environment that has already been visited by another sensor or the same sensor—this process is termed "loop detection". This step can be achieved via a search of nearby sensor data having a similar or the same location based on satellite-determined positioning data, or by determining statistical similarity in a bag-of-word representation of multiple sensor poses, or by determining similarity in the structure of localisation landmarks as computed in the second step, or through use of another form of semantic or appearance hashing where locations are mapped to memory addresses in such a way that similar locations are located in "nearby" memory addresses. Of course, a combination of such techniques may be used to carry out the loop detection process.

Second, a process termed "re-localisation" is performed where the relative pose is determined between corresponding pairs of poses (identifying any or each of rotation, translation or scale difference) determined in the loop detection step. As the relative pose of localisation landmarks is already known for individual logs from the second step, this can be achieved by cross-localisation of individual pieces of sensor data.

Figure 6:
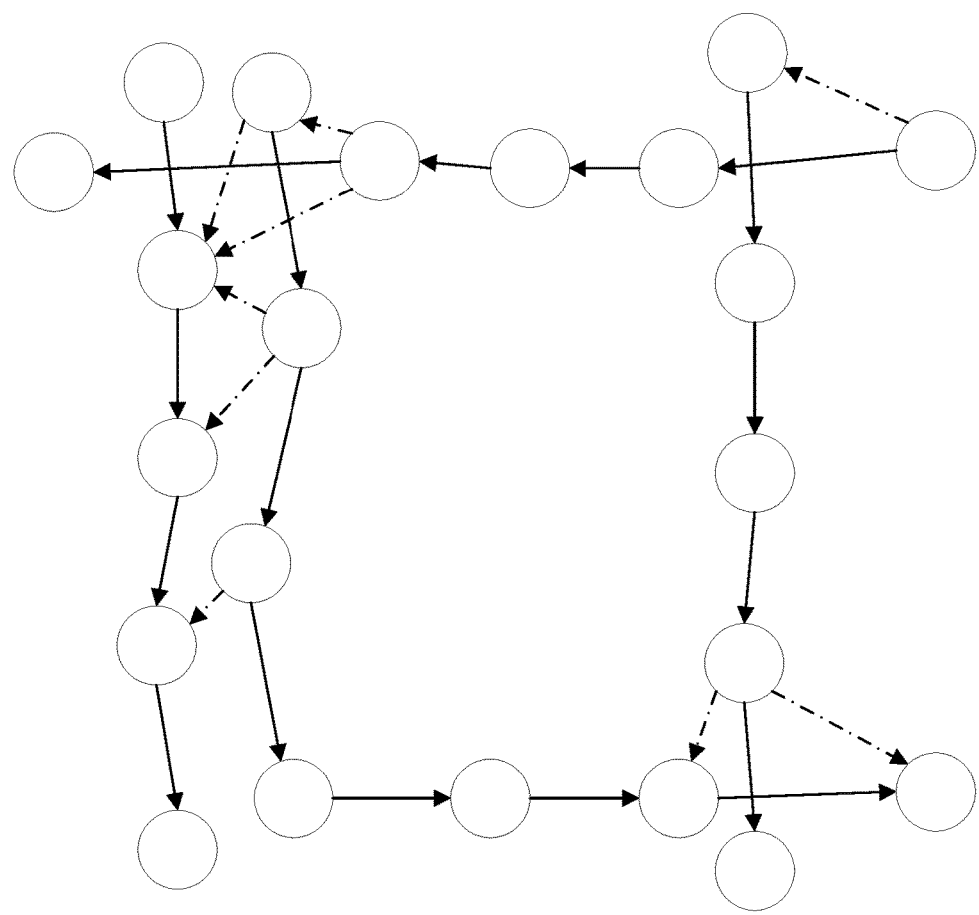
FIG. 6 illustrates the post constrains of the sequence of sensor measurements of FIG. 5 with additional links between related sensor measurements between platforms.

The computation required for this third step needs access to the logs (consecutive sensor measurements) from a portion of the map data (i.e. a zone surrounding one or more locations within the map data), and therefore the computation occurs in the centralised server after the data and the results of any local computation are transferred to the server. The computation can, however, be easily distributed across a cluster of computers based on for example geographical location. The output of this third step is a list of correctly detected loop closures between individual camera poses as illustrated in FIG. 6.

(4) Pose constraints 240 are generated;

The output of the first and second step results in a plurality of estimated relative pose transforms between various pieces of sensor data.

Due to the noise in the sensor data and imperfections in the sensors, the estimated pose transforms are likely to be noisy. The result of this is that in most cases no valid absolute (global) positions for the sensors which match the computed estimated pose transforms perfectly.

To allocate absolute (global) positions for each sensor over time to substantially match the pose transforms, a process termed "sensor pose optimisation" is performed. Sensor pose optimisation involves searching for a single assignment of variables that minimise the error between the absolute global positions and the estimated position derived from each sensor pose, where a collection of constraints are applied to the searching. In the embodiment, the variables correspond to relative sensor positions and the constraints are implied by the estimated relative transforms from the computations of the relative transformations between successive sensor poses and landmarks. Optionally, other constraints can be applied such as taking into account other data from sensors such as Global Navigational Satellite System ('GNSS') positioning data or IMU data. In an example, data from a GNSS sensor may be used to determine the absolute scale of the map, reduce the effect of drift, and improve the overall consistency of the absolute global positions.

This step does not involve optimising the relative position of landmarks, which significantly reduces the complexity of the problem and thus the problem can be solved very efficiently for millions of poses using off-the-shelf optimisation packages such as Ceres (RTM) or g2o. For extremely large instances, such as the ones corresponding to months of data collection at a global scale, a more tailored hierarchical approach might be needed.

Figure 7:
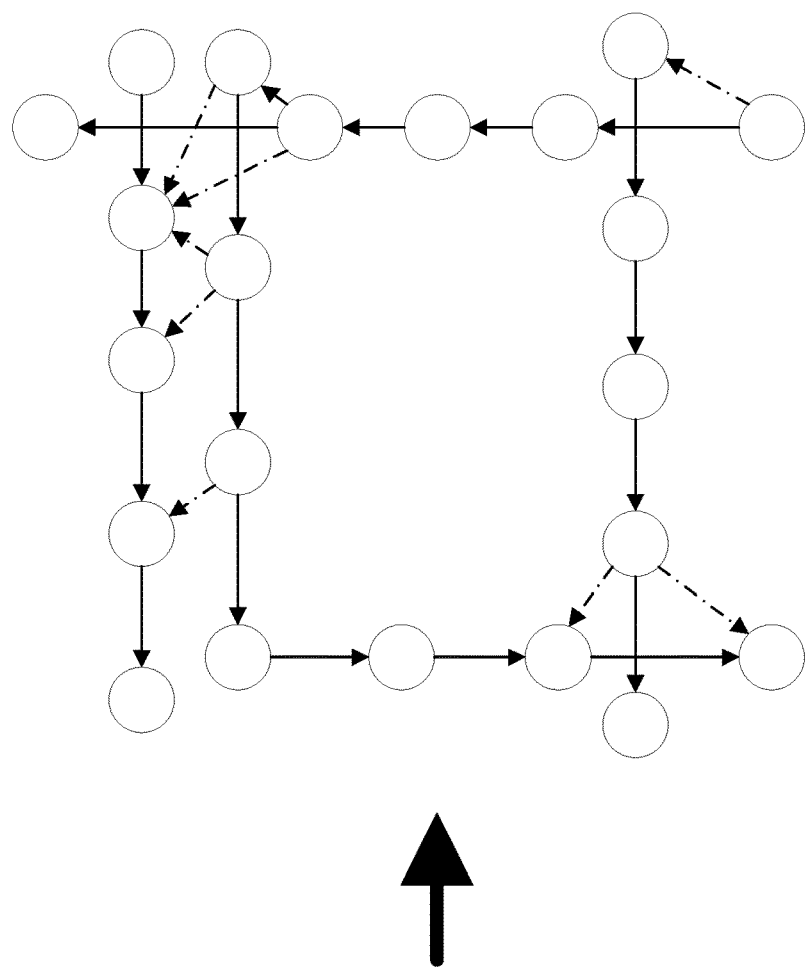
FIG. 7 illustrates optimised poses of the sequences of the sensor measurements of FIG. 6.
Figure 7:
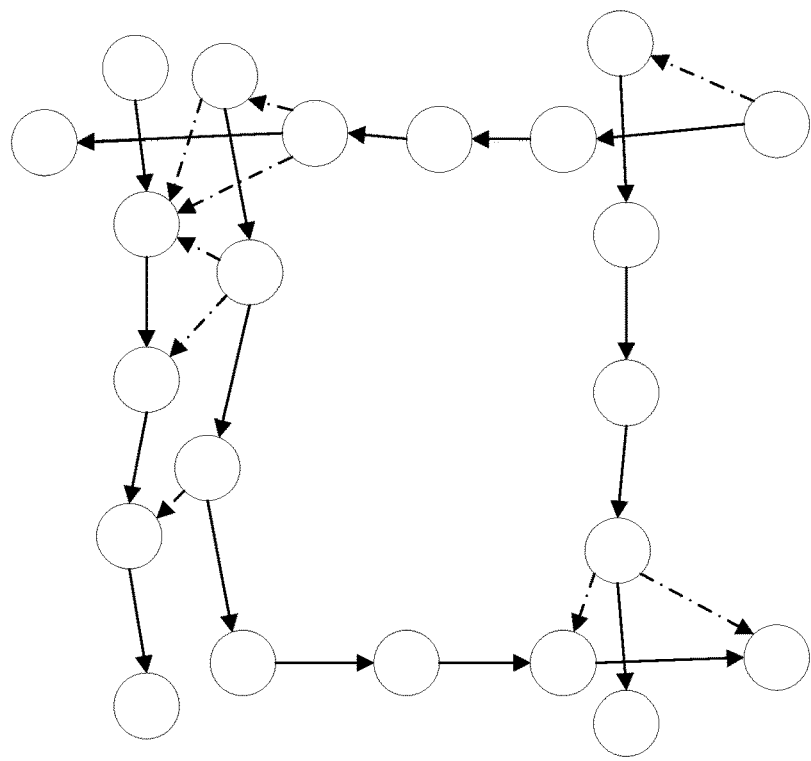

The output of this step is a globally and locally consistent six degrees-of-freedom pose for each sensor through time as illustrated in FIG. 7. Moreover, as the amount of data and number of constraints grows, the accuracy of the solution increases.

(5) The absolute global positions of localisation landmarks are determined;

With the absolute poses of individual sensor positions known, the global position of localisation landmarks can be computed directly by multiplying its relative pose (landmark-to-sensor), as computed in the second step, by the computed absolute global pose of its corresponding sensor pose. The multiplication operation may include translating and rotating the or each pose information.

Alternatively, the absolute position of individual localisation landmarks can be re-computed from known poses (a problem of "structure from known poses" or "structure-only bundle adjustment"), similar to the approach used in the second step, but instead using the optimised (global) poses. This computation can be carried very effectively in a distributed way as each landmark can be re-computed independently from all others.

The result of the previous computations is a globally consistent map of both sensor poses and localisation landmarks.

(6) Optionally, iterative refinement of the solution is performed.

This solution can be further enhanced in accuracy by various methods. For example, employing an iterative refinement scheme involving (a) re-computing poses from known landmarks (for example by using a motion only bundle-adjustment method); (b) re-computing landmarks (for example by using a structure only bundle-adjustment); and repeating these two steps until convergence is achieved, or by using a bundle adjustment method.

The system of some, or all, of these embodiments can be used in distributed large-scale scenarios with low-cost client hardware, for example mobile 'phones, and/or with any, or all, of: augmented reality headsets, self-driving cars, drones, and other robots.

The server system 10 and platforms 20*a*, 20*b*, 20*c*, 20*d* are in communication with each other, typically through a bandwidth-restricted communication channel, and in this embodiment for example the communications channel is a mobile 'phone cellular data network. In other embodiments, other wireless data networks may be used instead or in addition to a mobile 'phone cellular data network.

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

The invention claimed is:

1. A method comprising:
   determining, by a computing system, one or more estimated landmark positions for one or more localization landmarks relative to one or more moving devices based on sequential sensor data captured by the one or more moving devices;
   determining, by the computing system, one or more estimated device positions for the one or more moving devices based on the one or more estimated landmark positions relative to the one or more moving devices;
   determining, by the computing system, one or more refined device positions for the one or more moving devices in reference to a map by determining a variable that minimizes error between one or more global positions on the map and the one or more estimated device positions; and
   updating, by the computing system, the map with one or more refined global landmark positions for the one or more localization landmarks based on the variable and a correlation between the one or more refined device positions and the one or more estimated relative landmark positions.

2. The method of claim 1, wherein the determining the one or more refined device positions comprises minimizing a constraint based on estimated relative poses between sequential sensor poses associated with the one or more moving devices.

3. The method of claim 1, further comprising determining one or more differences between sequential sensor poses captured by the one or more moving devices based on one or more of: a time stamp for each sequential sensor pose or a relative pose between the sequential sensor poses.

4. The method of claim 1, wherein the one or more moving devices comprise one or more of: an image camera, a video camera, a laser based sensor, a depth camera, a stereo camera, a high dynamic range camera, a light detection and ranging sensor, and a radio detection and ranging sensor.

5. The method of claim 1, further comprising receiving determined differences between sequential sensor poses captured by the one or more moving devices which is determined in real-time by the one or more moving devices.

6. The method of claim 1, wherein the map comprises one or more portions linked by localization nodes associated with the one or more localization landmarks.

7. The method of claim 1, wherein the determining the one or more estimated landmark positions is based on triangulation of the sequential sensor data captured by the one or more moving devices.

8. The method of claim 1, wherein the determining the one or more estimated landmark positions comprises receiving one or more estimated relative landmark positions which are determined in real-time by the one or more moving devices.

9. The method of claim 1, further comprising determining absolute device poses based on one or more differences between sensor poses, wherein the determining the absolute device poses based on the one or more differences between the sensor poses comprises estimating a relative pose between captures by the one or more moving devices.

10. The method of claim 1, further comprising determining absolute device poses, wherein the determining the absolute device poses is performed on a centralized server or distributed across a cluster of computers within a network of computers.

11. The method of claim 1, further comprising determining one or more absolute global positions for the one or more localization landmarks by independently computing each absolute global position.

12. The method of claim 1, further comprising determining absolute device positions by minimizing a difference between the one or more estimated device positions and the one or more refined device positions.

13. The method of claim 1, further comprising determining an absolute global position for the one or more localization landmarks by using one or more of Global Navigation Satellite System (GNSS) data or Inertial Measurement Unit (IMU) data.

14. The method of claim 1 wherein the sequential sensor data captured by the one or more moving devices is distributed across a plurality of devices within a geographical area and the one or more refined global landmark positions for the one or more localization landmarks is determined independently by the plurality of devices.

15. The method of claim 1, further comprising:
   re-determining the one or more refined device positions from known landmarks; and
   re-determining the one or more refined global landmark positions of the one or more localization landmarks.

16. The method of claim 1, wherein the updating the map further comprising updating the map using the sequential sensor data, wherein the updating the map comprises one or more of:
   creating a new constraint or pose data in the map;
   updating or amending an existing node in the map;
   deleting a constraint or pose data in the map;
   optimizing the map; or
   performing global loop-closures to link positions of different localization constraint or pose data.

17. The method of claim 1, wherein the determining the one or more estimated landmark positions is further based on detected image features in the sequential sensor data.

18. The method of claim 1, further comprising providing a portion of the map to a device, wherein at least one of the one or more refined device positions or at least one of the one or more localization landmarks can be determined by the device based on the portion of the map.

19. The method of claim 1, wherein the one or more global positions on the map are allocated to the one or more estimated device positions for the one or more moving devices.

20. A non-transitory computer-readable medium comprising computer-executable instructions which, when executed, performs a method comprising:
   determining one or more estimated landmark positions for one or more localization landmarks relative to one or more moving devices based on sequential sensor data captured by the one or more moving devices;
   determining one or more estimated device positions for the one or more moving devices based on the one or more estimated landmark positions relative to the one or more moving devices;

determining one or more refined device positions for the one or more moving devices in reference to a map by determining a variable that minimizes error between one or more global positions on the map and the one or more estimated device positions; and updating the map with one or more refined global landmark positions for the one or more localization landmarks based on the variable and a correlation between the one or more refined device positions and the one or more estimated relative landmark positions.

21. The non-transitory computer-readable medium of claim 20, wherein the determining the one or more refined device positions comprises minimizing a constraint based on estimated relative poses between sequential sensor poses associated with the one or more moving devices.

22. A system comprising a processor and memory storing instructions that, when executed by the processor, cause the system to perform a method comprising:

determining one or more estimated landmark positions for one or more localization landmarks relative to one or more moving devices based on sequential sensor data captured by the one or more moving devices;

determining one or more estimated device positions for the one or more moving devices based on the one or more estimated landmark positions relative to the one or more moving devices;

determining one or more refined device positions for the one or more moving devices in reference to a map by optimizing determining a variable that minimizes error between one or more global positions on the map and the one or more estimated device positions; and aupdating the map with one or more refined global landmark positions for the one or more localization landmarks based on the variable and a correlation between the one or more refined device positions and the one or more estimated relative landmark positions.

23. The system of claim 22, wherein the determining the one or more refined device positions comprises minimizing a constraint based on estimated relative poses between sequential sensor poses associated with the one or more moving devices.

* * * * *